United States Patent [19]

Fukami et al.

[11] Patent Number: 4,678,118
[45] Date of Patent: Jul. 7, 1987

[54] DUAL-FUNCTION CAR SPOILER

[75] Inventors: Akira Fukami, Okazaki; Takao Oshiro, Toyoake; Hideaki Sasaya, Okazaki, all of Japan

[73] Assignee: Nippon Soken, Inc., Nishio, Japan

[21] Appl. No.: 640,986

[22] Filed: Aug. 15, 1984

[30] Foreign Application Priority Data

Oct. 14, 1983 [JP] Japan .............................. 58-192690
Oct. 27, 1983 [JP] Japan .............................. 58-202453

[51] Int. Cl.⁴ ............................................. B60H 1/02
[52] U.S. Cl. .................................. 237/12.3 B; 296/15; 180/903
[58] Field of Search ............. 165/41, 55; 237/12.3 A, 237/12.3 B, 12.3 R; 180/68.1, 68.2, 68.4, 903; 296/15

[56] References Cited

U.S. PATENT DOCUMENTS 3,837,395  9/1974  Coolidge .............................. 165/47

FOREIGN PATENT DOCUMENTS 852945 10/1952 Fed. Rep. of Germany ..... 180/68.1
716074 10/1966 Italy ................................. 180/68.1

Primary Examiner—Henry A. Bennet
Attorney, Agent, or Firm—Cushman, Darby & Cushman

[57] ABSTRACT

A car spoiler having an aerodynamic surface for controlling the airflow around the automotive body is provided with a built-in liquid handling means which is used as a liquid reservoir, heat storage tank, or heat exchanger. The heat storage tank may be used to store the hot coolant of the cooling system of the engine during normal operation and to supply the hot coolant to the cooling system in order to quickly warm up the engine or to the hot-water car heater system in order to heat the passenger compartment during cold start of the engine. The built-in heat exchanger may be used to cool the engine coolant, engine lubricant, or transmission oil of the automatic transmission system.

5 Claims, 10 Drawing Figures

DUAL-FUNCTION CAR SPOILER

BACKGROUND OF THE INVENTION

The present invention relates to a car spoiler having the dual functions of (1) improving the aerodynamic characteristics of an automobile body and (2) of handling liquids used in conjunction with the automobile.

Desirably, automobiles would be provided with liquid handling devices for various purposes in addition to the existing conventional liquid handling devices such as a fuel resevoir, radiator, and oil cooler. For example, passenger cars should be equipped with built-in water reservoirs for storing, for example, drinking water, because these cars are used not only for business but also for leisure purposes. As another example, vehicles should be provided with a heat storage tank or hot water storage tank which is capable of storing a part of the hot engine coolant circulated through the water jacket of the engines. In this instance, the hot coolant stored in such heat storage tanks may be used to quickly warm up the engine during a cold start or to operate the hot-water car heating system to heat the passenger compartment before the engine is warmed up. A further example is the desirability of fitting additional or substitute heat exchangers which can be mounted on the vehicle in a region where they are brought into direct contact with the flow of cool ambient air, in order to more effectively cool the engine coolant, engine oil, or transmission oil. The arrangement of the heat exchangers in such a cool air region has become desirable in view of the fact that the recent trend toward more compact and higher output engines has, in turn, increased the heat loads thereon.

Hitherto, however, the need for such liquid handling devices could not be satisfied because of the limitations caused by the lack of free spaces in the engine room, barring the installation of liquid handling devices having sufficient volumetric capacity. For this reason, the vehicle body design had to be modified if additional liquid handling device were to be mounted to the vehicles.

SUMMARY OF THE INVENTION

The present invention proposes to install the above-mentioned liquid handling devices in an automobile by advantageously utilizing the car spoilers inherently attached to the automobile body. Certain types of automobiles such as high speed passenger cars are provided with a car spoiler or air spoilers. Primarily, the spoilers are used to control the airflow around the automobile body to improve the aerodynamic characteristics thereof, such as the coefficient of drag $C_d$ and the coefficient of lift $C_L$, thereby stabilizing the steerability and enhancing the driveability of the automobile during high speed running. Spoilers are sometimes mounted on the engine hood to prevent dust from being deposited on the windshield. However, none of the conventional car spoilers are intended for liquid handling purposes.

According to the present invention, there is provided a dual-function car spoiler having an aerodynamic surface for controlling the airflow around the vehicle body, and a liquid handling means provided within the body of the car spoiler. The term "liquid handling" as used herein includes not only the storage, transportation, charging and discharging of liquid, but also any processing to be performed on the liquid to alter the thermodynamic status or condition thereof. The spoiler is further provided with a liquid supply means including an inlet and outlet for supplying the liquid to and withdrawing the liquid from the liquid handling means.

The liquid handling means may be used as a reservoir for drinking water or other liquid.

In another embodiment of the invention, the liquid handling means comprises a heat storage tank connected to the engine cooling system. During normal operation of the engine, a part of the hot coolant is stored in the heat storage tank. When the engine is stopped and is re-started after the engine has cooled down, the hot coolant in the heat storage tank may be circulated to the water jacket of the cooling system so as to quickly warm up the engine or may be fed to the car heater system to heat the passenger compartment.

Preferably, a temperature-responsive valve is provided which permits the hot coolant to flow from the engine cooling system to the heat storage tank when the engine is warmed up. When the coolant temperature in the engine is below a preset value, the valve interrupts the flow of coolant from the engine to the car heater system and circulates the hot coolant stored in the heat storage tank through the car heater system.

Thus, the spoiler with a built-in liquid reservoir according to the present invention performs a double function in the sense that it is capable of improving the aerodynamic properties of the vehicle body and that it is also capable of storing a liquid such as water and engine coolant. Therefore, an additional liquid reservoir is obtained without altering or modifying the design of the automobile body. The dual function car spoiler according to the present invention may be mounted to the vehicle in a simple manner by a single assembling operation. Furthermore, by thus effectively utilizing the inner space of the spoiler that would otherwise be left as a dead space, a reservoir having a large capacity can be provided without involving the problem of providing a special mounting space. The spoiler may be made from foamed plastics such as foamed polyurethane, which is easy to mould and is capable of insulating heat, and thus, the reservoir formed in the spoiler is suitable for storing cold water or hot coolant.

In a further embodiment of the invention, the liquid handling means comprises a heat exchanger. The heat exchanger may be connected to the engine cooling system, lubricating system or automatic transmission system to cool the engine coolant, lubricant or transmission oil.

Preferably, a through aperture is formed through the spoiler body in the longitudinal direction of the vehicle body and the heat exchanger is positioned across the through aperture to permit fresh air to flow and come in contact with the heat exchanger.

This embodiment incorporating the heat exchanger provides the following advantages:

(i) The spoiler has the dual function of improving the aerodynamic characteristics of the vehicle body and of cooling the engine, its accessory devices or other car equipment.

(ii) The problem of lack of space for mounting a heat exchanger is solved by utilizing the inner space and surface of the spoiler.

(iii) Since the spoiler may be disposed in a region where it is brought into sufficient contact with the airflow around the vehicle body, the heat exchange efficiency is increased during high speed running, in which the engine is operated at high speeds and at high loads.

Thus, a sufficient cooling effect is obtained through a more compact heat exchanger.

(iv) As the heat exchanger is in contact with a high speed airflow during the high speed running of the vehicle wherein the heat loads are increased, there is no need for a blower to assist the flow of cooling air through the heat exchanger.

(v) As the heat exchanger is mounted inside the outer configuration of the spoiler body, there is no danger to pedestrians.

These and other features and advantages of the invention will become apparent from the following description taken in conjunction with the accompanying drawings.

BRIEF DESCRIPTION OF THE DRAWINGS

Throughout the drawings, like reference numerals are used to designate like parts and members.

DESCRIPTION OF THE PREFERRED EMBODIMENTS

Figure 1:
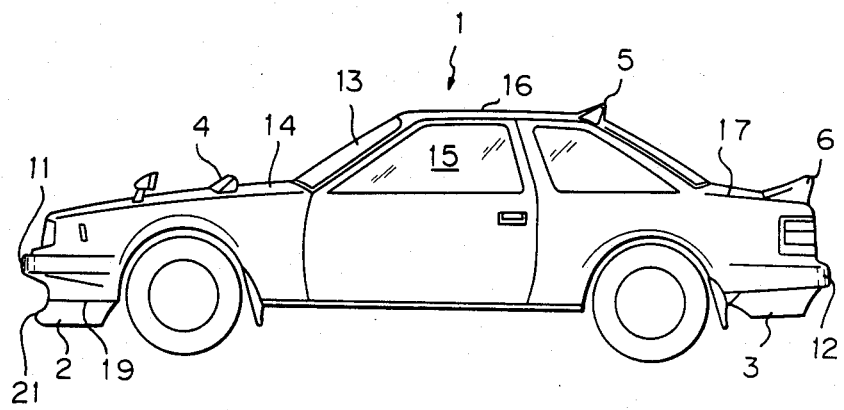
FIG. 1 is a side elevational view of a passenger car equipped with the spoiler according to the present invention.

Referring to FIG. 1, there is shown a passenger car 1 having various spoilers. These spoilers may be classified into two groups, for example, those mounted under the vehicle body and those mounted on the upper part of the body. The former group of spoilers includes an air dam type spoiler or air dam skirt 2 which is mounted to the lower surface 19 of the vehicle body under a front bumper 11 to break up the air current tending to flow thereunder, and a rear under air spoiler 3 which is mounted to the vehicle body lower surface under a rear bumper 12 located at the back of the vehicle body and which serves to prevent the airflow from swirling up behind the vehicle body. The latter group of spoilers includes a front air spoiler 4 mounted on an engine hood 14 in front of a windshield 13 and serving to prevent mud, water, insects, and other foreign particles from impinging on the windshield and also to exert a downward aerodynamic pressure on the front part of the vehicle body to prevent floatation of that part due to lift; a roof air spoiler 5 mounted at the rear end of a roof 16 of a passenger compartment 15 and acting to prevent floatation of the vehicle body rear part due to lift; and a rear air spoiler 6 mounted on the rear end of a trunk lid 17 and designed to exert a downward aerodynamic pressure on the vehicle body rear part to suppress floatation of that part due to lift.

Figure 2:
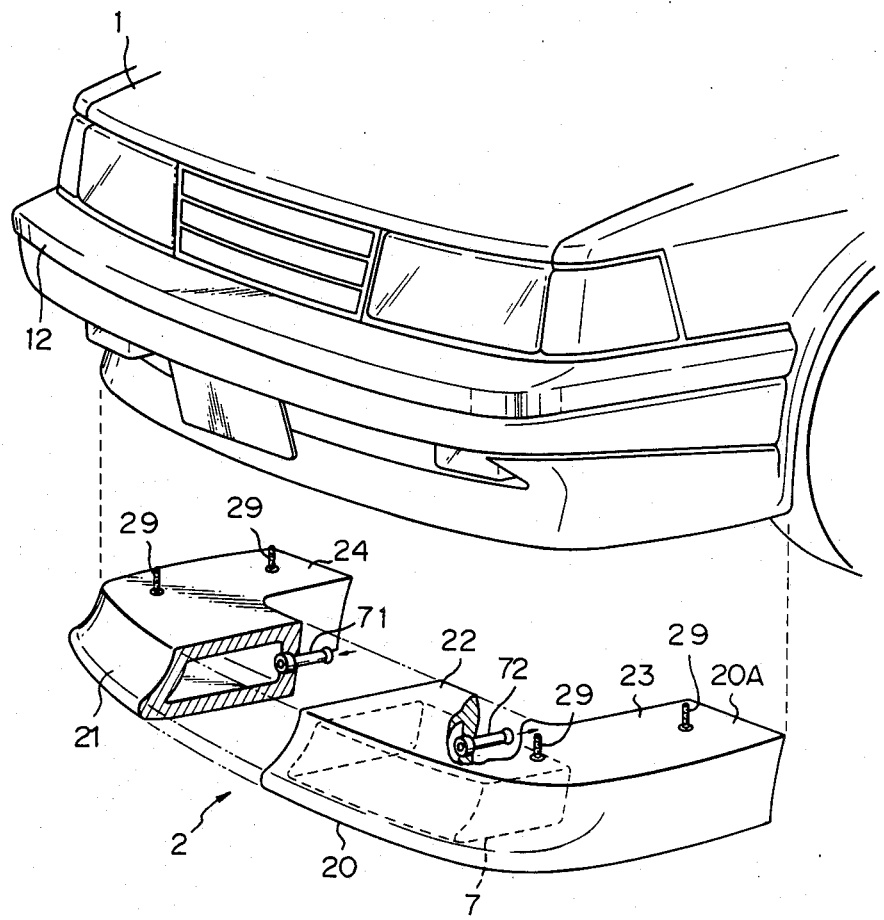
FIG. 2 is a perspective view, partly cut away, of an air dam type spoiler, according to the embodiment of the present invention, when detached from the vehicle.

Referring to FIG. 2, there is shown a first embodiment of the invention. In this embodiment, the air dam skirt 2 comprises a spoiler body 20 in which is provided a water reservoir 7.

Figure 3:
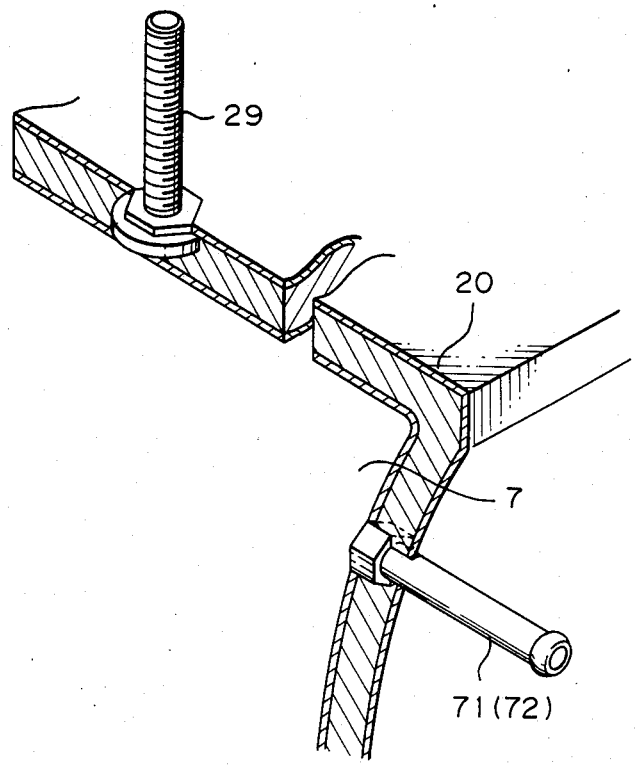
FIG. 3 is an enlarged partial perspective view, partly cut away, of the spoiler of FIG. 2.

The inner part of the body 20 of the air dam skirt 2 is made of a low bulk density molding material such as soft foamed polyurethane and provided with an inner cavity 7 serving as a water reservoir. The outer surface of the body 20 and the inner surface of the cavity 7 are covered, for example, by a layer of rigid dense polyurethane. The body 20 is somewhat U-shaped and comprises a transversal member 22 securable to the lower surface of the front part of the vehicle body and a pair of integral side members 23 and 24 extending rearward from the ends of the transversal member 22 along both sides of the lower surface of the vehicle body front part. The front surface 21 of the body 20 is warped forward at the lower part thereof in a skirt-like fashion to form an aerodynamic surface. In this embodiment, the spoiler body 20 is secured to the lower surface 19 (FIG. 1) of the vehicle body by means of four stud bolts 29 having their heads embedded under the upper surface 20A of the body 20 and having their threaded shanks projecting upward. In this embodiment, the water reservoir 7 is formed within the length of the transversal member 22 of the body 20 of the air dam skirt 2 and is provided at one end with an inlet pipe 71 and at the other end with an outlet pipe 72. As shown in FIG. 3, a part or all of the embedded portions of the bolts 29 and pipes 71 and 72 may have a hexagonal cross section to restrain their rotation with respect to the body 20.

Figure 4:
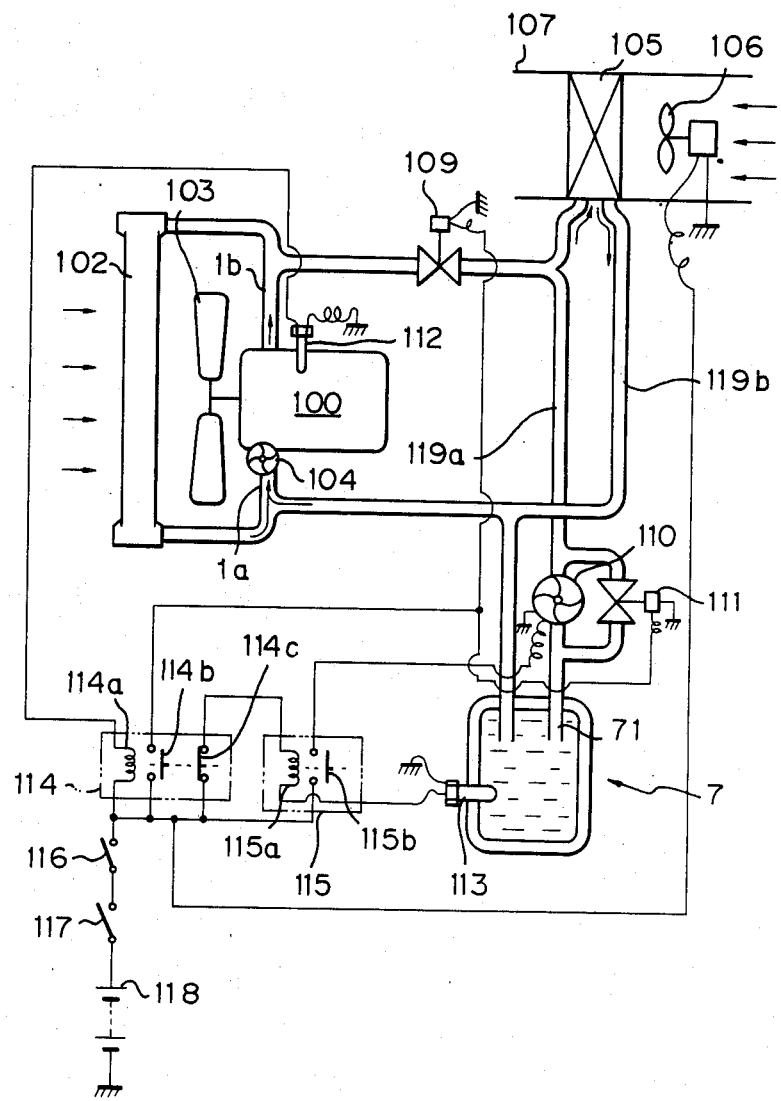
FIG. 4 is a schematic representation of a hot-water car heating system incorporating the heat storage tank according to the present invention.

FIG. 4 is a schematic illustration of a hot-water car heater system wherein the water reservoir 7 in the air dam skirt 2 is used as a heat storage tank for heating the passenger compartment with the hot coolant during a cold start of the engine. In the drawing, 100 is a water-cooled engine of the vehicle, 102 a radiator for cooling the coolant, 103 a radiator cooling fan driven by the engine 100, 104 a water pump mounted at the coolant inlet of the water jacket of the engine 100 and driven by the engine for circulating the coolant, 105 a heater core of the hot water car heater using the coolant as its heat source, 106 an electrically driven blower for the heater core 105, and 107 a heater housing receiving the heater core 105, the blower 106 and the like and usually mounted under the dash panel in the passenger compartment, the heater housing 107 forming part of the air conditioning system including, as usual, a defroster outlet, ventilation outlet, floor outlet and the like (not shown). Designated at 7 is the heat storage tank formed in the body 20 of the air dam skirt 2 as described with reference to FIG. 2.

The heater core 105 and the heat storage tank 7 are connected in parallel with each other between the coolant inlet 1a and the coolant outlet 1b of the engine 100. Designated at 109 is a solenoid valve placed in a coolant line passing through the heater core 105 and the engine 100. 110 and 111, respectively, are an electrically driven water pump and a solenoid valve which are mounted in parallel with each other in a line passing through the heat storage tank 7 and the heater core 105.

A first temperature sensor 112 is mounted to the water jacket of the engine 100 for detecting the temperature of the coolant circulated through the engine. This sensor 112 has contacts which are closed when the coolant temperature reaches 45° C., for example. A second temperature sensor 113 is arranged on the heat storage tank 7 for detecting the temperature of the coolant received therein. The second sensor 113 is provided with contacts which are closed when the temperature of the coolant in the tank 7 exceeds a predetermined value, for example, 45° C. The first and second sensors 112 and 113 may be in the form of a bimetal switch or reed switch which is opened and closed at the magnetic transformation temperature of thermoferrite. Indicated at 114 is a relay which is controlled by the first temperature sensor 112 and includes a coil 114a, normally open contacts 114b, and normally closed contacts 114c. Designated at 115 is a relay controlled by the second temperature sensor 113 and comprising a coil 115a and normally open contacts 115b. Indicated at 116 is a manual switch for the car heater system, 117 a key switch for the engine, and 118 a battery mounted on the vehicle. 119a and 119b are water lines between the heater core 105 and the heat storage tank 7.

The operation of the car heater system of FIG. 4 is as follows. The engine key switch 117 is turned on to re-start the engine 100 and then the heater switch 116 is turned on. At the time of this re-starting, the coolant temperature at the second sensor 113 is higher than the preset value and the sensor 113 is closed because the heat storage tank 7 is storing the hot coolant which has been heated to an elevated temperature (for example, 80° C.) during the previous engine running. Therefore, upon turning on the heater switch 116, an electric current is fed to the coil 115a of the relay 115 causing the normally open contacts 115b to close, whereby the water pump 110 is energized to circulate the hot coolant in the tank 7 through the heater core 105. At the same time, the blower 106 is energized causing air to flow through the heater core 105. However, during cold start of the engine, the temperature of the coolant within the water jacket is still low during the initial period of operation of the engine so that the first temperature sensor is held open causing the relay 114 to be de-energized. Therefore, the solenoid valves 109 and 111 remain de-energized and are closed, thereby preventing the cold coolant in the water jacket of the engine from flowing into the heater core 105. As a result, only the hot coolant in the heat storage tank 7 is circulated by the pump 110 through the heater core 105, in which the hot coolant exchanges heat with the air from the blower 106 to heat the air which is then forwarded toward the floor of the passenger compartment through the outlet of the heater housing 107 thereby warming the passenger compartment.

In an alternative embodiment, the hot coolant in the heat storage tank 7 may be circulated through the water jacket of the engine in order to quickly warm up the engine during cold starting.

Figure 5:
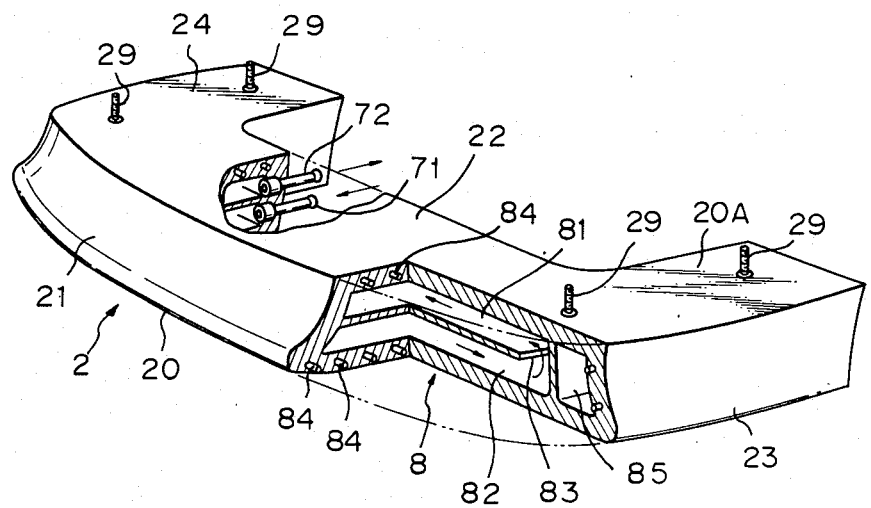
FIG. 5 is a perspective view, partly cut away, of an air dam skirt according to another embodiment of the present invention.

Referring to FIG. 5, there is shown another embodiment of the invention wherein a heat storage tank 8 in the body 20 of the air dam skirt 2 is designed to prevent a mixing of the cold and hot masses of coolant. The heat storage tank 8 includes an upper chamber 81 and an underlying lower chamber 82. These chambers 81 and 82 are separated from one another by an intermediate horizontal wall which is recessed at 83 to communicate both chambers at an end thereof. In this embodiment, the inlet pipe 71 and the outlet pipe 72 are connected, respectively, to the lower chamber 82 and the upper chamber 81 at the end thereof opposite the aperture 83.

With this arrangement, the mass of cold coolant having a higher density will expel the mass of hot coolant having a smaller density as it enters the storage tank so that the flow of coolant is largely straightened, thereby avoiding a mixing of the hot and cold water masses and ensuring that the hot coolant is smoothly discharged through the outlet pipe 72.

The spoiler body 20 may be reinforced by a network of embedded metal wires 84 so as to cope with the weight of the water received in the heat storage tank 8. In this embodiment, a reservoir 85 for the windshield wiper washer liquid is provided in the spoiler 2 adjacent to the heat storage tank 8. The washer liquid kept warm by the hot coolant in the tank 8 may be used to melt ice formed on the windshied during cold weather conditions.

Figure 6:
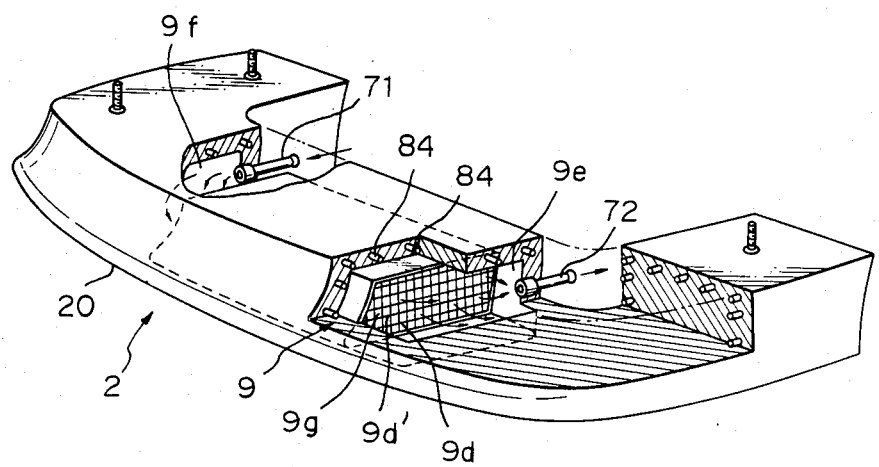
FIG. 6 is a perspective view, partly cut away, of an air dam skirt according to a further embodiment of the present invention.
Figure 7:
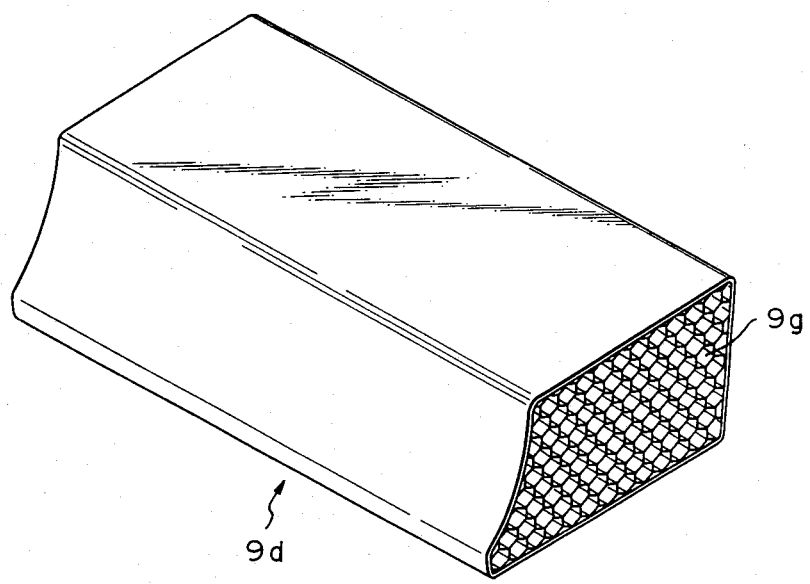
FIG. 7 is a perspective view of a flow straightener structure formed in the heat storage tank.

FIG. 6 illustrates another embodiment of the dual function car spoiler wherein the heat storage tank incorporated in the spoiler body is provided with a flow straightener capable of more positively preventing the mixing of the hot and cold masses of coolant. In this embodiment, the heat storage tank 9 formed in the spoiler body 20 of the air dam skirt 2 is provided with a flow straightener 9d extending between the narrow inlet and outlet zones 9f and 9e. The flow straightener 9d comprises a plurality of thin plates 9d' made, for example, from aluminum and intersecting at a right angle to each other to define a plurality of channels 9g. The flow straightener may have a honeycomb structure as shown in FIG. 7. Also, the cross sectional configuration of the channels 9g may be triangular. The surface of the respective plates 9d' is made smooth so as to reduce the flow resistance of coolant flowing from the inlet zone 9f to the outlet zone 9e.

For the reason mentioned hereinafter, the length D of a side of each channel 9g (or its equivalent pipe diameter D') preferably may be selected so that the Reynolds number of the current flowing through the channels 9g is in the order of from 10 to 20. The Reynolds number Re is given by the equation $$Re = U \cdot D / \nu$$

wherein U is the average velocity of flow in m/sec and $\nu$ is the kinetic viscosity of water, whereas the average velocity U is given by the equation $$U = Q/A^2$$

wherein Q is the discharge in m²/sec and A² is the total cross sectional flow area in m² of the heat storage tank. Thus, the length D is determined once the discharge Q and the total cross sectional flow area A² are given. Assuming, for example, $$Q = 1 \text{ l/min} = 1.67 \times 10^{-5} \text{ m}^3/\text{sec},$$

$$A^2 = 15 \text{ cm} \times 15 \text{ cm} = 2.25 \times 10^{-2} \text{ m}^2,$$

and $$\nu = 0.5 \times 10^{-2} \text{ m}^2/\text{sec},$$

then $$D < 1.3 \times 10^{-2} \, m = 13 \, mm.$$

Thus, with the foregoing values of Q and $A^2$, the length D may be selected in the order of 10 mm. It is also preferable that the volume of the outlet and inlet zones 9e and 9f be made as small as possible.

The heat storage tank 9 of FIG. 6 may be used in the car heater system shown in FIG. 4 in place of the heat storage tank 7. The coolant is pumped through the conduit 119a to the heater core 105 in which it is cooled by heat exchange with the air in the passenger compartment. The thus cooled coolant passes through the conduit 119b to flow into the inlet zone 9f of the tank 9. The cold coolant flowing into the inlet zone 9f will be mixed with the hot coolant already stored therein. However, the loss of heat due to mixing will be minimized as the volume of the inlet zone 9f is sufficiently small. The coolant flow into the inlet zone 9f is distributed relatively uniformly over all the channels 9g of the flow straightener 9d because the flow resistance through the flow straightener 9d is slightly greater than that through the inlet zone 9f. The flow in the channels 9g is a laminar flow which flows very smoothly without turbulance or eddy current because the Reynolds number is selected to be in the order of from 10 to 20. Thus, the cold coolant flowing into the channels will move therethrough to gradually expel the hot coolant therein, thereby avoiding any mixing at the boundary between them as well as avoiding any loss of hot coolant.

Figure 8:
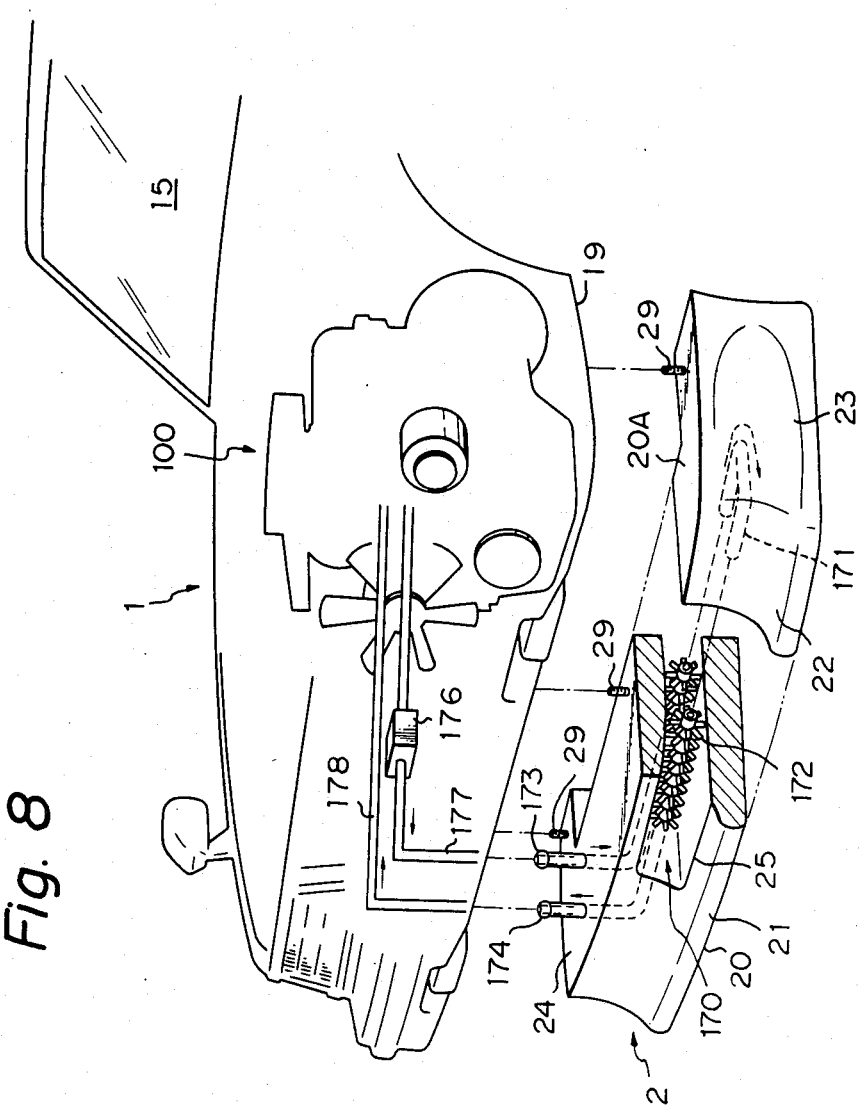
FIG. 8 is a perspective view, partly cut away, of the spoiler, according to the fourth embodiment of the present invention, when detached from the vehicle.

FIG. 8 illustrates a fourth embodiment of the invention wherein the dual-function car spoiler 2 is provided with a heat exchanger 170. The body 20 of the spoiler 2 has an aperture 25 extending therethrough in the longitudinal direction of the automobile body. The heat exchanger 170 includes a U-shaped tube 171 having sections exposed within the aperture 25. The exposed sections of the tube 171 are provided with a plurality of heat transfer fins 172. The inlet and outlet ends 173 and 174 of the U-tube 171 are turned upward to project beyond the upper surface 20A of the spoiler body 20. The heat exchanger 170 may have structures other than that illustrated. For example, it is possible to use heat exchangers having multiple finned tubes, having secondary heat transfer surfaces, or having integral fins formed by cutting and bending parts of the wall of the tube.

The coolant is circulated through the heat exchanger 170 by means of a supply hose 177 connected between the water jacket of the engine 100 and the inlet end 173 and provided with a solenoid valve 176, and by means of a return hose 178 connected between the suction port of the water pump and the outlet end 174. During operation of the engine, the valve 176 is energized manually or automatically to allow the coolant to pass through the heat exchanger 170, thereby transferring heat to the ambient air and cooling the coolant.

It will be appreciated that, since the air dam skirt 2 is normally located inside of the horizontal configuration of the front bumper, the air dam skirt will be protected by the front bumper from any damage occurring during vehicle collision. It will also be appreciated that the finned tube sections of the heat exchanger 170 are located within the through aperture and to the rear of the front surface 21 of the spoiler body 20. Thus, the heat exchanger has no projection protruding beyond the front surface 21 and, therefore, there is no danger of the heat exchanger causing bodily injuries during a collision with a pedestrian. When the vehicle is running at a high speed, a high pressure is exerted on the front surface of the air dam spoiler and the rear surface thereof is subjected to a low pressure. Thus, there is a high speed airflow flowing through the aperture 25. Therefore, the higher the speed of the vehicle, the higher is the heat exchanging efficiency obtained, thereby ensuring an adequate cooling with a compact heat exchanger. It is desirable to advantageously utilize the ram effect of the airflow through the aperture 25 to increase the airflow speed and to enhance the cooling efficiency. To this end, the aperture 25 may be flared forward so as to increase the transversal cross-sectional flow area of the inlet portion.

Figure 9:
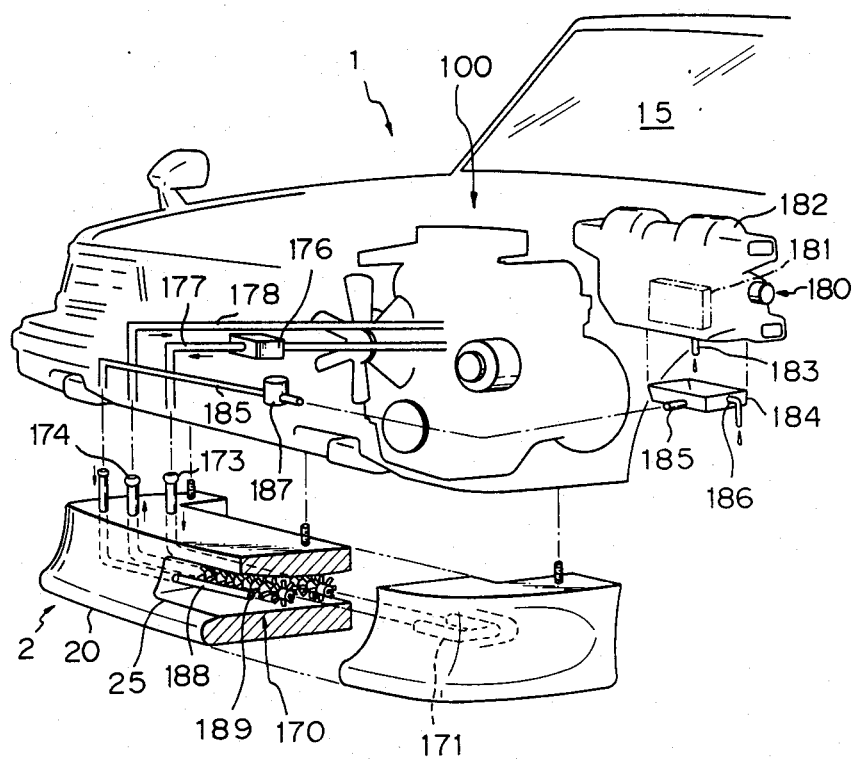
FIG. 9 is a perspective view, partly cut away, of the fifth embodiment of the present invention, when detached from the vehicle.

FIG. 9 shows another form of the dual-function car spoiler having a heat exchanger adapted to be wet-cooled by spraying the finned tubes with the condensate formed on an evaporator of a car air-conditioning system. Parts and members similar to those of the embodiment of FIG. 8 are indicated by like reference numerals and are not described again.

The air-conditioning system 180 disposed in the front part of the passenger compartment 15 comprises an evaporator 181 and a blower 182. The condensate formed on the evaporator 181 is drained through a drain pipe 183 into a condensate pan 184 having an overflow 186 for maintaining the condensate in the pan 184 at a predetermined level. The condensate pan 184 is connected by a drain line 185 to a spray tube 188 which is disposed in front of the heat exchanger 170 and extends across the aperture 25 in the spoiler body 20. The section of the spray tube 188 extending within the aperture 25 is provided with a plurality of spray nozzles 189 directed toward the heat exchanger 170. An electric-motor driven water pump 187 is provided in the drain line 185 to take up the condensate in the pan 184 and pump it toward the spray tube 188.

During daylight hours in a hot summer season, in which the vehicle engine tends to become over-heated and to require intense cooling, the air-conditioning system is normally operated so that the condensate is available in the condensate pan 184. In this embodiment, the coolant temperature may be detected by a suitable temperature sensor (not shown), and when the temperature of the coolant exceeds a predetermined value, for example, 100° C., the water pump 187 is operated to inject a spray of condensate from the spray tube 188 over the heat exchanger 170. The sprayed condensate will evaporate and on doing so will absorb heat from the heat exchanger 170, thereby increasing the cooling efficiency thereof.

Figure 10:
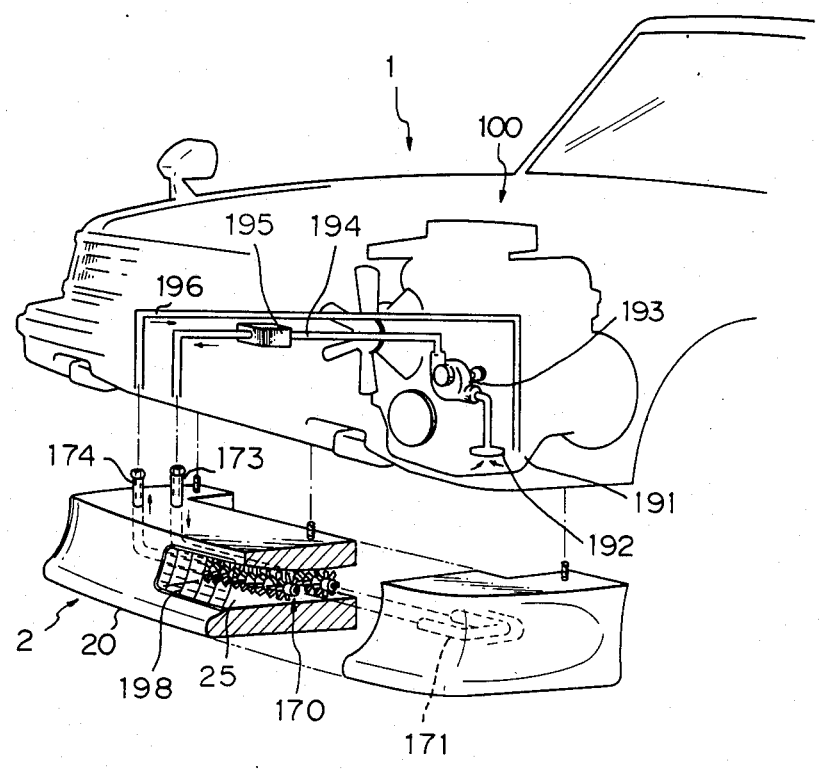
FIG. 10 is a perspective view, partly cut away, of the sixth embodiment of the present invention when used in connection with a lubricant cooling system of the engine.

FIG. 10 illustrates another application of the dual-function car spoiler wherein the heat exchanger 170 incorporated in the spoiler body 20 of an air dam skirt 2 is used to cool the engine lubricant or transmission oil.

Designated at 191 is an oil pan mounted to the bottom of the engine or an automatic transmission system. The engine oil or transmission oil is picked up through an oil strainer 192 and is pumped by an oil pump 193 through an oil line 194 to the heat exchanger 170. The oil circulated through the heat exchanger 170 is returned to the oil pan 191 through a return line 196. A solenoid valve 195 is provided in the oil line 194 to control the flow of oil therethrough. In this embodiment, a network or a grill 198 is provided at the mouth of the aperture 25 to protect the heat exchanger 170.

In operation, an oil temperature sensor submerged, for example, under the oil in the oil pan 191 senses the temperature of oil and, when the oil temperature reaches the predetermined value, automatically turns on the solenoid valve 195 to circulate the oil through the heat exchanger 170, thereby cooling the engine oil or transmission oil and avoiding overheating of the oil.

Although the present invention has been described herein with reference to the specific embodiments thereof, it should be understood that the invention is not limited thereby but various changes and modifications may be made thereto. For example, the dual function car spoiler has been described herein as embodied in the air dam skirt 2. However, another car spoiler such as the rear under air spoiler 3, the front air spoiler 4, the roof spoiler 5, and the rear air spoiler 6 may be provided with a liquid handling means according to the present invention. Particularly, in a rear engine vehicle, the heat exchanger may be advantageously incorporated in a rear under air spoiler 3. Where the liquid handling means in the spoiler comprises a water reservoir, a part of the wall surrounding the reservoir may be made porous so as to allow seeping therethrough of water which evaporates and cools the water in the reservoir. Furthermore, the heat exchanger provided in the car spoiler may be used to cool the refrigerant in the air-conditioning system, and the aerodynamic surface of the spoiler may be used as a heat transfer surface of the heat exchanger.

We claim:

1. A hot-water type passenger compartment heating system for an automobile having an engine with a cooling system and having a dual-function car spoiler secured to the vehicle body for aerodynamically controlling the airflow around the vehicle body, said heating system comprising:

a car heater unit disposed in a heat exchange relationship with the air in the passenger compartment;

first conduit means for circulating a coolant in said cooling system through said car heater unit;

a hot coolant reservoir provided in said car spoiler in a heat insulating manner from the ambient air;

second conduit means for connecting said first conduit means to said hot coolant reservoir; and valve means responsive to the coolant temperature for interrupting the flow of coolant from the engine to said car heater unit and circulating the coolant stored in said hot coolant reservoir through said car heater unit when the coolant temperature at the engine is below a predetermined value and for supplying the hot coolant from the engine to said hot coolant reservoir when the engine is warmed up.

2. A heating system as defined in claim 1, wherein said hot coolant reservoir comprises lower and upper chambers communicated with each other at an end thereof and wherein said second conduit means comprises coolant inlet and coolant outlet pipes connected, respectively, with said lower and upper chambers at the other end thereof.

3. A heating system as defined in claim 1, wherein said second conduit means comprises a coolant inlet located at an end of said hot coolant reservoir and a coolant outlet located at the other end thereof and wherein said hot coolant reservoir comprises flow straightening means for directing the coolant to flow therethrough substantially without turbulence from said coolant inlet to said coolant outlet.

4. A heating system as defined in claim 3, wherein said flow straightening means comprises means for defining a plurality of discrete parallel channels extending lengthwise of the hot coolant reservoir.

5. A heating system as defined in claim 4, wherein said means for defining a plurality of discrete parallel channels has a honeycomb structure.

* * * * *